(12) United States Patent
Chen

(10) Patent No.: US 6,371,013 B1
(45) Date of Patent: Apr. 16, 2002

(54) FRUIT SQUEEZER WITH AN ADDITIVE ADDING MECHANISM

(75) Inventor: Chien-Chang Chen, Tainan (TW)

(73) Assignee: Tsann Kuen USA Inc., Pasadena, CA (US)

( * ) Notice: Subject to any disclaimer, the term of this patent is extended or adjusted under 35 U.S.C. 154(b) by 0 days.

(21) Appl. No.: 09/921,217

(22) Filed: Aug. 2, 2001

(51) Int. Cl.7 .............................. A23N 1/00; A47J 19/02
(52) U.S. Cl. ............................ 99/504; 99/501; 99/503; 99/505; 99/508
(58) Field of Search ........................... 99/495, 501–508, 99/516, 483; 100/98 R, 208, 213

(56) References Cited

U.S. PATENT DOCUMENTS

| | | | | |
|---|---|---|---|---|
| 1,661,374 A | * | 3/1928 | Lacey | 99/507 |
| 1,861,426 A | * | 5/1932 | Davis | 99/503 X |
| 1,888,528 A | * | 11/1932 | Faulds | 99/504 |
| 1,957,346 A | * | 5/1934 | Larson | 99/505 |
| 1,966,978 A | * | 7/1934 | Estrada et al. | 99/504 |
| 2,008,899 A | * | 7/1935 | Daum | 99/507 |
| 2,017,960 A | * | 10/1935 | Faulds | 99/504 X |
| 2,081,424 A | * | 5/1937 | Daum | 99/507 X |
| 2,160,388 A | * | 5/1939 | Morse | 99/503 X |
| 2,517,519 A | * | 8/1950 | Wurgaft | 99/504 X |
| 2,629,317 A | * | 2/1953 | Nelson | 100/98 R |
| 4,951,563 A | * | 8/1990 | Warren et al. | 100/213 X |
| 5,035,174 A | * | 7/1991 | Seal, Jr. | 100/98 R |

* cited by examiner

*Primary Examiner*—Timothy F. Simone
(74) *Attorney, Agent, or Firm*—Brinks Hofer Gilson & Lione

(57) ABSTRACT

A fruit squeezer includes a hollow stand, a water container mounted on the stand, a juice collector mounted in the water container, a reamer mounted rotatably in the juice collector, a squeezing member disposed above and movable toward the reamer, and an additive adding mechanism that includes an electric heater mounted in the hollow stand, an additive container mounted in the water container and in fluid communication with the juice collector, and a conduit assembly in fluid communication with the water container and the additive container and including a heated section passing over and heated by the heater.

3 Claims, 4 Drawing Sheets

FRUIT SQUEEZER WITH AN ADDITIVE ADDING MECHANISM

BACKGROUND OF THE INVENTION

1. Field of the Invention

This invention relates to a fruit squeezer, more particularly to an electrical fruit squeezer with an additive adding mechanism.

2. Description of the Related Art

Squeezed fruit juice is normally added with additives, such as sugar and honey. However, conventional fruit squeezers are currently not built with an additive adding mechanism that is capable of automatically adding additives to the squeezed fruit juice during the course of squeezing.

SUMMARY OF THE INVENTION

Therefore, the object of the present invention is to provide a fruit squeezer that is capable of overcoming the aforementioned drawback.

Accordingly, a fruit squeezer of this invention comprises: a hollow stand; a water container mounted on the stand and adapted to store water; a juice collector mounted in the water container; a reamer mounted rotatably in the juice collector; a squeezing member disposed above and movable toward the reamer; and an additive adding mechanism including an electric heater mounted in the hollow stand, an additive container mounted in the water container and in fluid communication with the juice collector, and a conduit assembly in fluid communication with the water container and the additive container and including a heated section passing over and heated by the heater so that water coming from the water container by virtue of gravity is heated at the heating section and is vaporized into water vapor which enters into and which is condensed in the additive container via the conduit assembly.

BRIEF DESCRIPTION OF THE DRAWINGS

In drawings which illustrate an embodiment of the invention.

DETAILED DESCRIPTION OF THE PREFERRED EMBODIMENT

Figure 1:
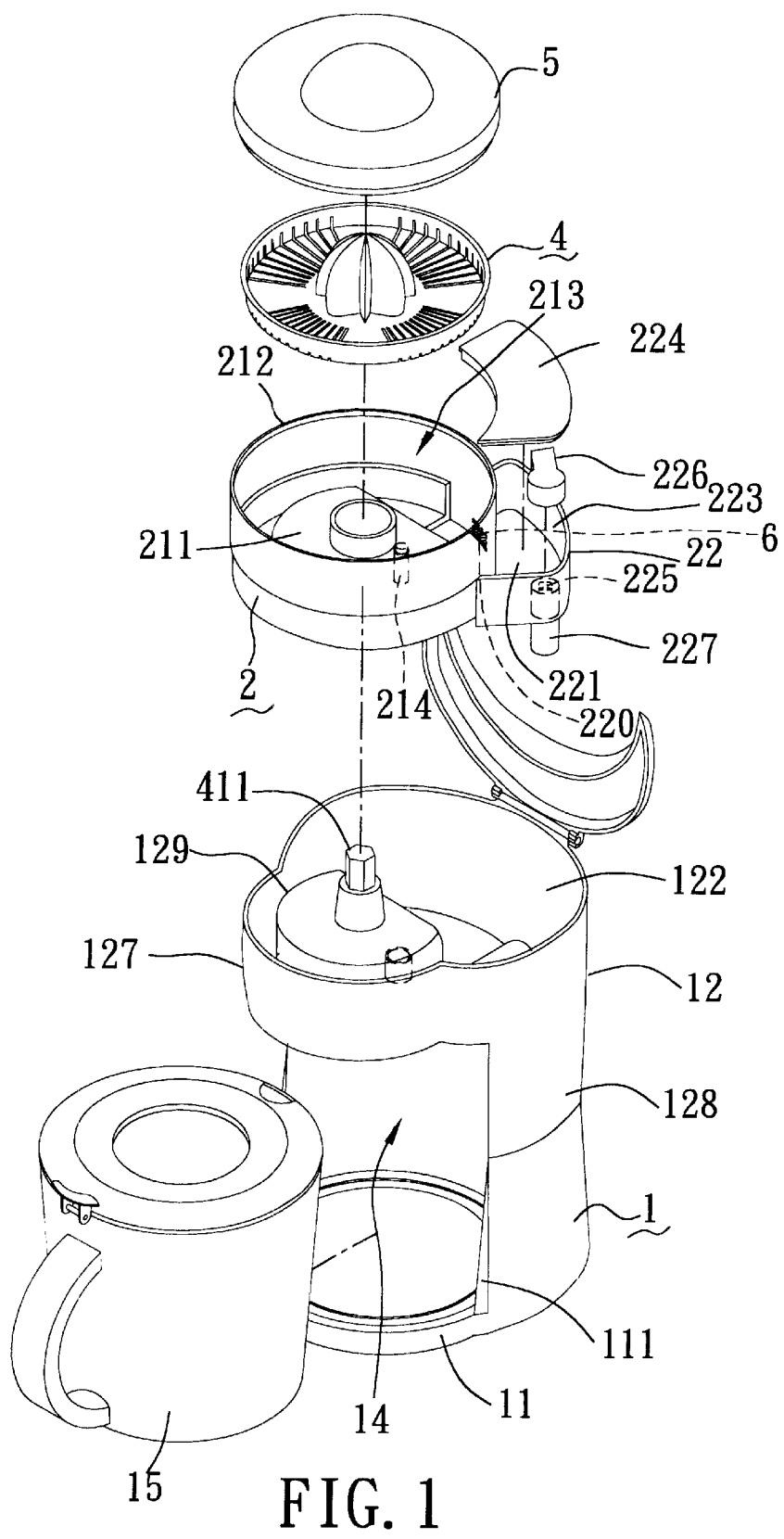
FIG. 1 is an exploded view of a fruit squeezer embodying this invention.
Figure 2:
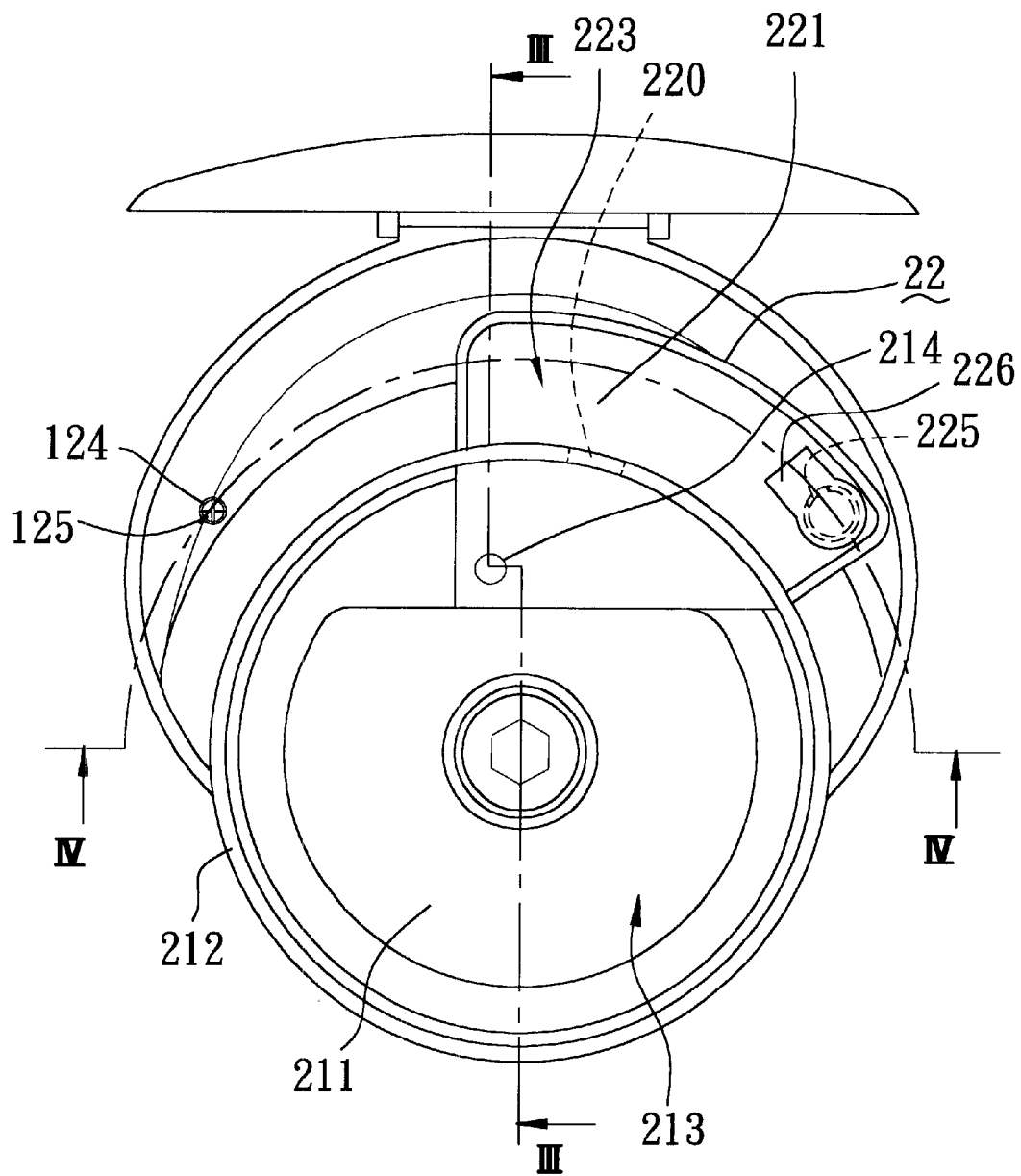
FIG. 2 is a top view of the fruit squeezer of FIG. 1.
Figure 3:
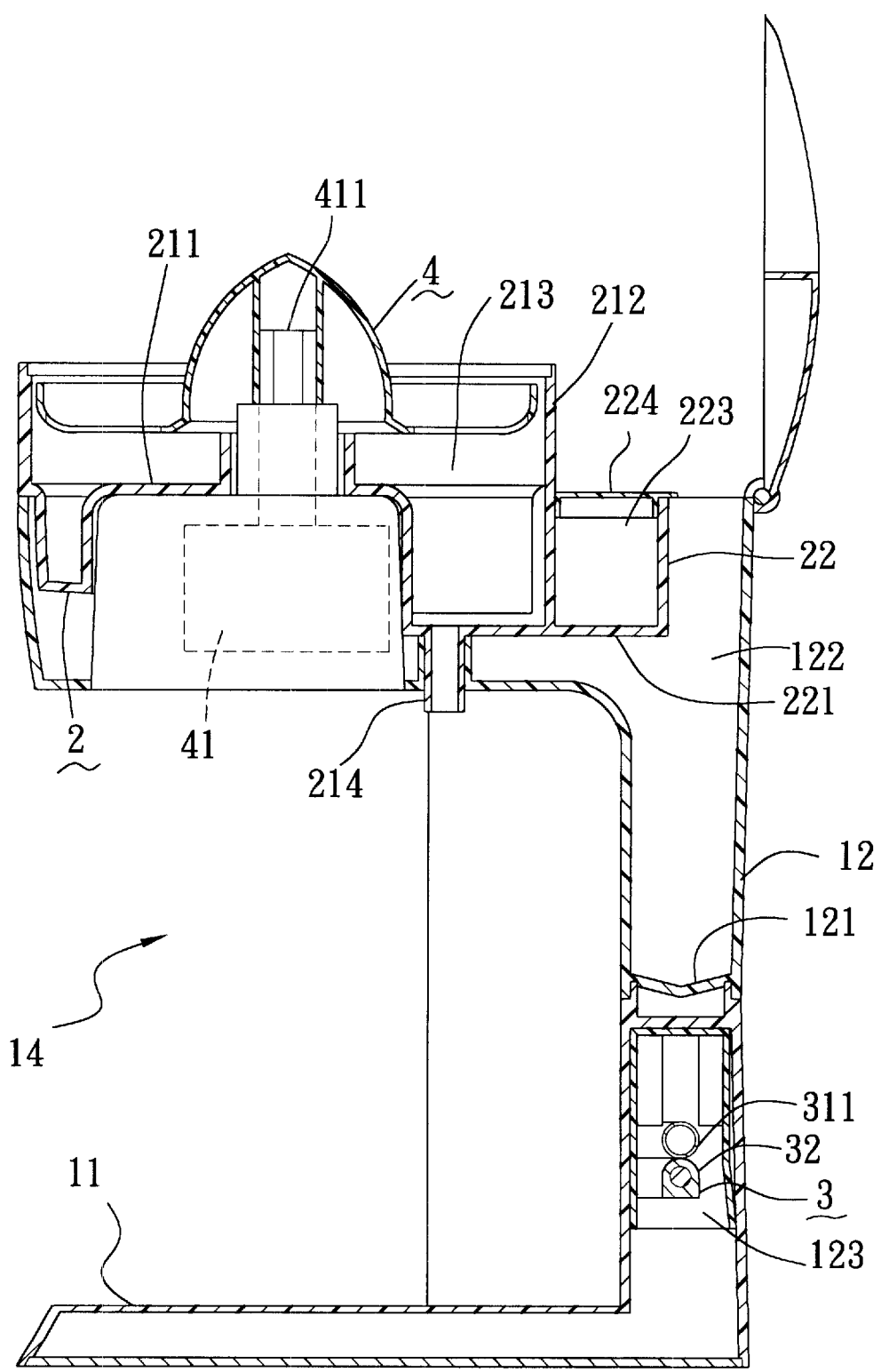
FIG. 3 is a cross-sectional view taken along line III—III in FIG. 2.
Figure 4:
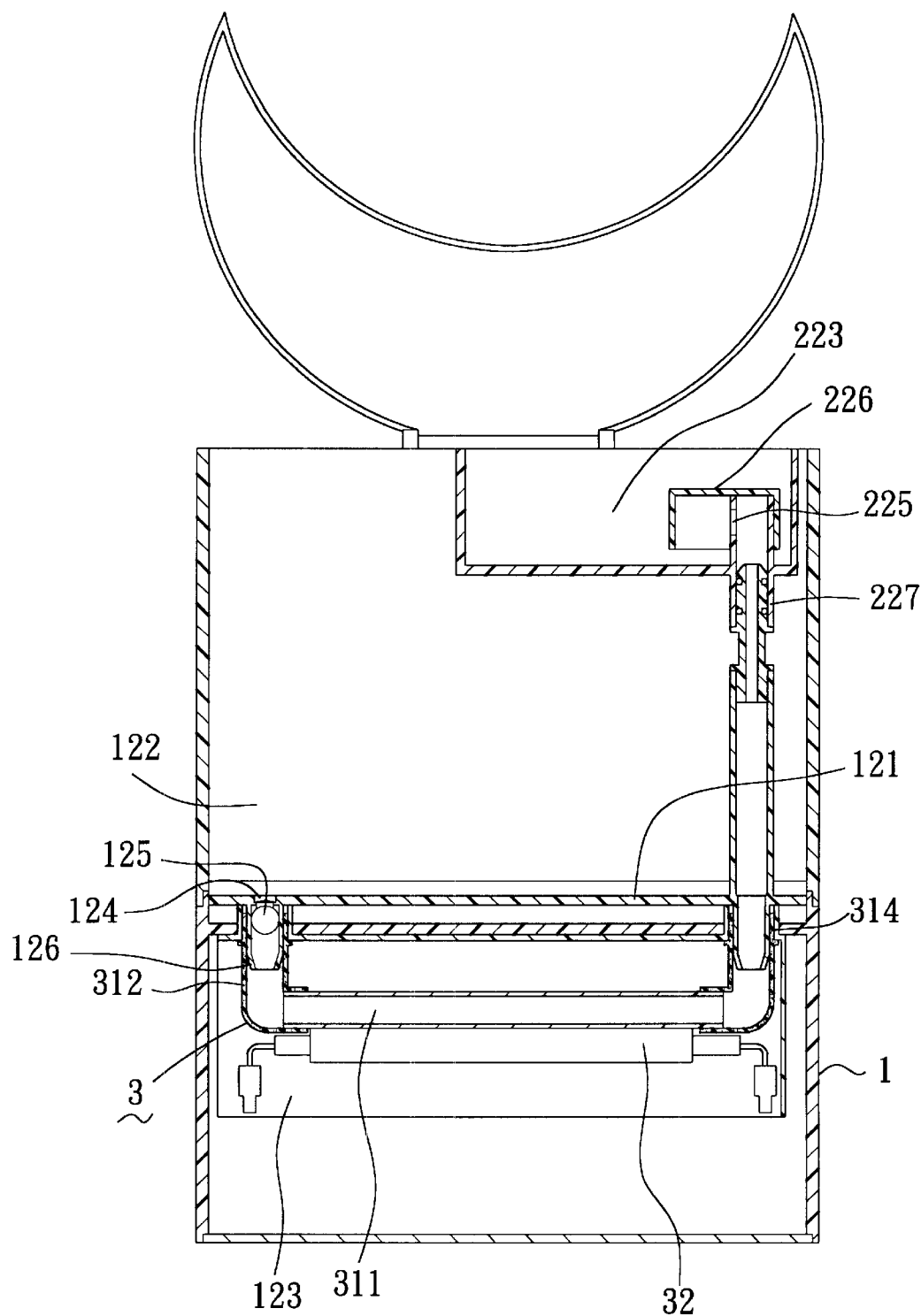
FIG. 4 is a cross-sectional view taken along line IV—IV in FIG. 2.

FIGS. 1 to 4 illustrate a fruit squeezer embodying this invention. The fruit squeezer includes a hollow stand 1 having a base portion 11 and a hollow upright portion 111 that defines a heater mounting space 123, a water container 12 mounted on the upright portion 111 of the stand 1 and adapted to receive water, a juice collector 2 mounted in the water container 12 for collecting fruit juice, a reamer 4 mounted rotatably in the juice collector 2, a squeezing member 5 disposed above and movable toward the reamer 4, and an additive adding mechanism which includes an electric heater 32 mounted in the heater mounting space 123 in the upright portion 111 of the hollow stand 1, an additive container 22 mounted in the water container 12 for receiving an additive and in fluid communication with the juice collector 2, and a conduit assembly 3 that is in fluid communication with the water container 12 and the additive container 22 and that includes a heated section 311 passing over and heated by the heater 32 so that water coming from the water container 12 by virtue of gravity is heated at the heating section 311 and is vaporized into water vapor which enters into and which is condensed in the additive container 22 to mix with the additive. The thus-formed mixture enters the juice collector 2 via the conduit assembly 3 to mix with the fruit juice.

The juice collector 2 has a base wall 211, a bottom tube 214 that extends downwardly from a bottom of the base wall 211, and an annular wall 212 that projects upwardly from the base wall 212 to confine a juice collecting space 213 therebetween and that is formed with an opening 220, and a filter 6 mounted fittingly in the opening 220.

The additive container 22 is integrally formed with and projects outwardly and radially from the annular wall 212 of the juice collector 2, confines an additive storing space 223 that is in fluid communication with the juice collecting space 213 in the juice collector 2 via the filter 6, and has a bottom wall 221 and a vapor exit tube 227 which extends through the bottom wall 221 and which has a top end that is formed with an aperture 225 above the bottom wall 221. A vapor guide 226 is mounted on the top end of the vapor exit tube 227 for guiding water vapor from the aperture 225. A cover 224 covers a top opening of the additive container 22.

The water container 12 defines a water storing space 122 and has an enlarged upper portion 127 and a reduced lower portion 128 that is reduced from the upper portion 127, that extends downwardly from the upper portion 127 to a top end of the upright portion 111 of the stand 1, and that has a bottom wall 121 formed with a hole 124. A water drain tube 126 extends downwardly from a periphery of the hole 124 in the bottom wall 121 of the lower portion 128 of the water container 12. A check valve 125 is disposed in the water drain tube 126 for preventing water from reversing from the heated section 311 of the conduit assembly 3 to the water storing space 122 in the water container 12. A hollow motor mounting seat 129 projects upwardly from a bottom of the upper portion 127 of the water container 12 for accommodating a motor 41 that includes a shaft 411 projecting upwardly therefrom into the juice collecting space 213 to engage the reamer 4. The upper and lower portions 127, 128 of the water container 12 cooperate with the stand 1 to define a recess 14 thereamong for receiving a juice pitcher 15.

The conduit assembly 3 further includes a water inlet section 312 interconnecting the heated section 311 and the water drain tube 126, and a vapor rising section 314 extending from the heated section 311 through the lower portion 128 of the water container 12 and into the upper portion 127 of the water container 12 to connect with the vapor exit tube 227 so as to permit water to flow into the heated section 311 from the water container 12 and so as to permit water vapor generated at the heated section 311 to flow into the additive container 22 and to mix with the additive.

Due to the presence of the additive adding mechanism, the aforementioned drawback associated with the conventional fruit squeezer can be eliminated.

With the invention thus explained, it is apparent that various modifications and variations can be made without departing from the spirit of the present invention. It is therefore intended that the invention be limited only as recited in the appended claims.

I claim:

1. A fruit squeezer comprising:

a hollow stand;

a water container mounted on said stand and adapted to store water;

a juice collector mounted in said water container;

a reamer mounted rotatably in said juice collector;

a squeezing member disposed above and movable toward said reamer; and an additive adding mechanism including an electric heater mounted in said hollow stand, an additive container mounted in said water container and in fluid communication with said juice collector, and a conduit assembly in fluid communication with said water container and said additive container and including a heated section passing over and heated by said heater so that water coming from said water container by virtue of gravity is heated at said heating section and is vaporized into water vapor which enters into and which is condensed in said additive container via said conduit assembly.

2. The fruit squeezer of claim 1, wherein said juice collector has a base wall and an annular wall projecting upwardly from said base wall and formed with an opening, and a filter mounted fittingly in said opening, said additive container being integrally formed with and projecting outwardly and radially from said annular wall, being in communication with said juice collector via said filter, and having a bottom wall and a vapor exit tube which extends through said bottom wall and which has a top end that is formed with an aperture above said bottom wall.

3. The fruit squeezer of claim 2, wherein said water container has an enlarged upper portion and a reduced lower portion that is reduced from said upper portion, that extends downwardly from said upper portion to said stand, and that has a bottom wall provided with a water drain tube, said conduit assembly further including a water inlet section interconnecting said heated section and said water drain tube, and a vapor rising section extending upwardly from said heated section through said lower portion of said water container and into said upper portion of said water container to connect with said vapor exit tube.

* * * * *